United States Patent
Le et al.

(10) Patent No.: US 6,711,164 B1
(45) Date of Patent: Mar. 23, 2004

(54) METHOD AND APPARATUS FOR PERFORMING IP-ID REGENERATION TO IMPROVE HEADER COMPRESSION EFFICIENCY

(75) Inventors: Khiem Le, Coppell, TX (US); Zhigang Liu, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/434,377

(22) Filed: Nov. 5, 1999

(51) Int. Cl.$^7$ .............................................. H04L 12/28
(52) U.S. Cl. ........................ 370/392; 370/389; 370/471; 709/247
(58) Field of Search ................................ 370/392, 389, 370/390, 465, 471, 473, 474, 475, 351, 349, 352, 401, 477, 355, 395.1; 709/247, 236

(56) References Cited

U.S. PATENT DOCUMENTS

| 6,032,197 | A  | * | 2/2000  | Birdwell ..................... 709/247 |
| 6,236,341 | B1 | * | 5/2001  | Dorward ....................... 341/60 |
| 6,300,887 | B1 | * | 10/2001 | Le ............................. 341/60 |
| 6,314,095 | B1 | * | 11/2001 | Loa ............................ 370/352 |
| 6,385,199 | B2 | * | 5/2002  | Yoshimura .................. 370/393 |
| 6,388,584 | B1 | * | 5/2002  | Dorward ....................... 341/51 |

OTHER PUBLICATIONS

M. Degermark et al, "Low–Loss TCP/IP Header Compression for Wireless Networks", Wireless Networks 3, 1997, pp. 375–387.

\* cited by examiner

Primary Examiner—Douglas Olms
Assistant Examiner—Ricardo M. Pizarro
(74) Attorney, Agent, or Firm—Antonelli, Terry, Stout & Kraus, LLP

(57) ABSTRACT

A method and apparatus operable in a system having a transmitter and receiver for reducing the overhead for compressing headers of a plurality of packets that form a transmission unit, wherein the header of each packet includes identification (ID) information identifying the packets as part of the transmission unit. The invention operates by reassembling the packets that form the transmission unit and removing the ID information from the header of each of the packets that form the transmission unit. After removing the ID information from the header of each packets, the headers of the packets are compressed and the packets having the compressed headers are transmitted from the transmitter to a receiver. The receiver upon receiving the packets having the compressed headers, decompresses the compressed headers to obtain the packets that form the transmission unit. New ID information is then regenerated and inserted in the headers of each of the packets that form the transmission unit so as to identify the packets that belong to the same transmission unit.

1 Claim, 3 Drawing Sheets

METHOD AND APPARATUS FOR PERFORMING IP-ID REGENERATION TO IMPROVE HEADER COMPRESSION EFFICIENCY

BACKGROUND OF THE INVENTION

The present invention relates to compression and decompression of headers in packet transmission. More particularly, the present invention relates to a method and apparatus for performing IP-ID regeneration to improve header compression efficiency.

For Internet Protocol (IP) based real-time multimedia applications, packets (Datagrams) are used to carry the real-time data. Each packet includes a header and a payload. The header carries information each as source and destination address of the packet. The payload carries the data to be transmitted. Each packet is formatted according to the Real-Time (RTP) which is predominately used on top of User Datagram Protocol (UDP) which is used on top of the IP. RTP is described in detail in "RTP: A Transport Protocol for Real-Time Applications" by H. Schulzrinne, et al, Internet Engineering Task Force (IETF), Request for Comments (RFC) 1889, January 1996. The size of a combined IP/UDP/RTP header for a packet is at least 40 bytes for IPv4 and at least 60 bytes for IPv6. A total of 40–60 bytes overhead per packet may be considered heavy in streams (e.g., such as cellular network) where spectral efficiency is a primary concern. Consequently, a need arises for suitable IP/UDP/RTP header compression mechanisms. A current header compression scheme is described in "Compressing IP/UDP/RTP Headers for Low-Speed Links", by S. Casner et al, IETF, RFC 2508, February 1999 and "IP Header Compression" by M. Degermark, et al, IETF, RFC 2507, February 1999. This header compression scheme is able to compress the 40–60 bytes IP/UDP/RTP header down to 2 or 4 bytes over point-to-point links.

Header compression is crucial for extending the IP network to cellular systems. Real-time multimedia applications usually generate a large number of packets each with a large header and a small payload. These packets need to be transferred over wireless interfaces using precious radio resources. An example of the format of a header according to IPv4 is illustrated in FIG. 1.

In general, the efficiency of a header compression algorithm heavily depends on the number and linearity of the changing fields in the IP/UDP/RTP headers of the packets. One of such fields in the IP header is the IP Identification (ID) field 101 illustrated in FIG. 1. The IP-ID field 101 identifies the packet as being part of an original large packet which may, for example, exceed the Maximum Transmission Unit (MTU) for the network.

It is typically difficult to compress the IP-ID in the header of a packet using existing header compression schemes. This is due to the fact that the IP-ID in the IP-ID field of the headers of a packet of the flow can change in a non-linear fashion. The non-linearity of the changes of the IP-ID of packets of a particular flow introduces overhead to the compressed headers and thus decreases header compression efficiency.

To more fully understand the problem, it should be noted that when a large packet (transmission unit) need to traverse a network having an MTU that is smaller than the size of the packet, fragmentation is necessary. This fragmentation can happen at either the source host which generates the large packet or at one of the routers (gateways) along the path from the source host to the destination host.

Each packet resulting from the fragmentation of the large packet is assigned an IP-ID by the IP module residing in the operating system of the source host. In most implementations, the IP module simply increments a 2 byte counter in IPv4 and a 4 byte counter in Ipv6. The IP module, whenever it receives a packet from an upper level protocol, uses the value of the counter as the IP-ID for that packet and then increments the counter. Thus, all outgoing flows from the source host share the same counter and compete with each other for an IP-ID. Therefore, when observing the packet of one transmission unit in one flow, the IP-ID of each packet of the transmission unit may appear to be non-linear and even worst with no predictable pattern at all.

This is a serious problem for existing header compression schemes, since header compression relies upon either the linearity or the predictability of the fields of the headers of the packets. If a particular field is not linear or predictable then the field cannot be compressed and must be transmitted with the packet in its full state, thereby reducing header compression efficiency.

The above problem is illustrated in FIG. 2 wherein a multimedia application at a host A 202 transmits audio information by a first flow 201, video information by a second flow 203 and any IP packets by a third flow 205. The first and second flows 201 and 203, respectively, are carried to a host B 204 and the third flow 205 is carried to a host C 206. As illustrated, the IP-ID for the packets a transmission unit on of the first flow 201 can, for example, take on the values of 1, 9, 12, 14, 17 . . . , respectively, whereas the IP-ID of the packets of a transmission unit on the second flow 203 can, for example, take on the values of 2, 5, 6, 11, 13 . . . , respectively. Further, the IP-ID of the packets of the third flow 205 can, for example, take on the values of 3, 4, 10, 15, 16 . . . , respectively. Thus, the IP-ID's of each of the packets for each of the transmission units of each of the flows are non-linear and unpredictable.

A compressor 208 when encountering the first and second flows 201 and 203, respectively, must compress the two flows with respect to two different contexts, context 1 and context 2 respectively. For each context the IP-ID of each of the packets for each of the flows will introduce significant compression overhead due to their non-linearity and unpredictability. In other words, the IP-ID for each packet must be kept in its original form since it would be impossible to compress and use as part of the reference header in the context since the values that the IP-ID take on for each subsequent packet is non-linear and unpredictable. Thus, header compression efficiency is reduced.

SUMMARY OF THE INVENTION

The present invention provides a method and apparatus for performing IP-ID regeneration to improve header compression efficiency.

The present invention is operable in a system having a transmitter which transmits a plurality of packets to a receiver wherein each of the packets contains a header including identification (ID) information identifying the packet as part of a transmission unit. In the present invention, the overhead for compressing headers of a plurality of packets that form a transmission unit can be reduced by reassembling the packets that form the transmission unit, removing the ID information from the headers of the packets that form the transmission unit, and after removing the ID information, compressing the headers of the packets that form the transmission unit. The packets having the compressed headers are then transmitted from the transmitter to the receiver.

Further, in the present invention, the receiver, upon receiving the packets having the compressed header, decompresses the compressed headers to obtain again the packets included in the transmission unit. Thereafter, new ID information is regenerated and inserted in each of the headers of the packets that form the transmission unit. The regenerated ID information again identifies each of the packets that form part of the transmission unit.

BRIEF DESCRIPTION OF THE DRAWINGS

The present invention will be more apparent from the following detailed description, when taken in conjunction with the accompanying drawings, in which.

DETAILED DESCRIPTION OF THE INVENTION

The present invention will be described with respect to FIG. 3. It should be noted that the present invention can be implemented either by hardware or software wherein each of the elements can correspond to hardware elements, computer programs or sections of computer programming code. The computer programs can, for example, be stored on a storage medium readable by a computer wherein the storage medium can, for example, be semiconductor memory, floppy disk, CD ROM, flash memory, etc.

One of the goals of the present invention is to avoid the compression of the IP-ID field of the header of a packet since the IP-ID can be non-linear and unpredictable. By avoiding the compression of the IP-ID of each packet, the efficiency of the header compression scheme being used is improved. The present invention avoids the compression of the IP-ID of the packets that form a transmission unit by reassembling the packets that form the transmission unit and removing the IP-ID from the headers of each of the packets. In the present invention, once the IP-ID has been removed, the headers of the packets that form the transmission unit can be compressed and then transmitted from the compressor to the decompressor. The decompressor upon receipt of the packets having the compressed headers, decompresses the compressed headers to obtain again the packets that form the transmission unit. Thereafter, a new IP-ID for each packet is regenerated and inserted in the header of the packet. The new IP-ID inserted in each packet again identifies the packet as being part of the transmission unit.

It should be noted that the compressor and decompressor can be implemented by hardware, software or a combination thereof and may form part of apparatus such as a host, terminal, router, etc. A link or communication channel connects the compressor to the decompressor. The link or communication channel is used by the compressor to transmit packets having compressed headers to the decompressor.

By use of the present invention as described above, the integrity of the packets that form the transmission unit can be preserved over the underlying communication channel between the compressor and the decompressor. Thus, end-to-end transparency of the IP-ID is unnecessary.

The present invention as described above, is useful even though packet fragmentation where a large packet has a size greater than the MTU for the communication channel to be used rarely happens. Thus, the present invention as implemented is effective in selective situations that do not occur regularly. A typical situation in which the present invention finds its application is when the IP network is used to carry real-time multimedia packets corresponding to particular flows. In real-time applications, long delays are intolerable, thus small packets are sent to insure short inter-packet spacing. These packets have a size much smaller than the MTU of the network.

Figure 3:
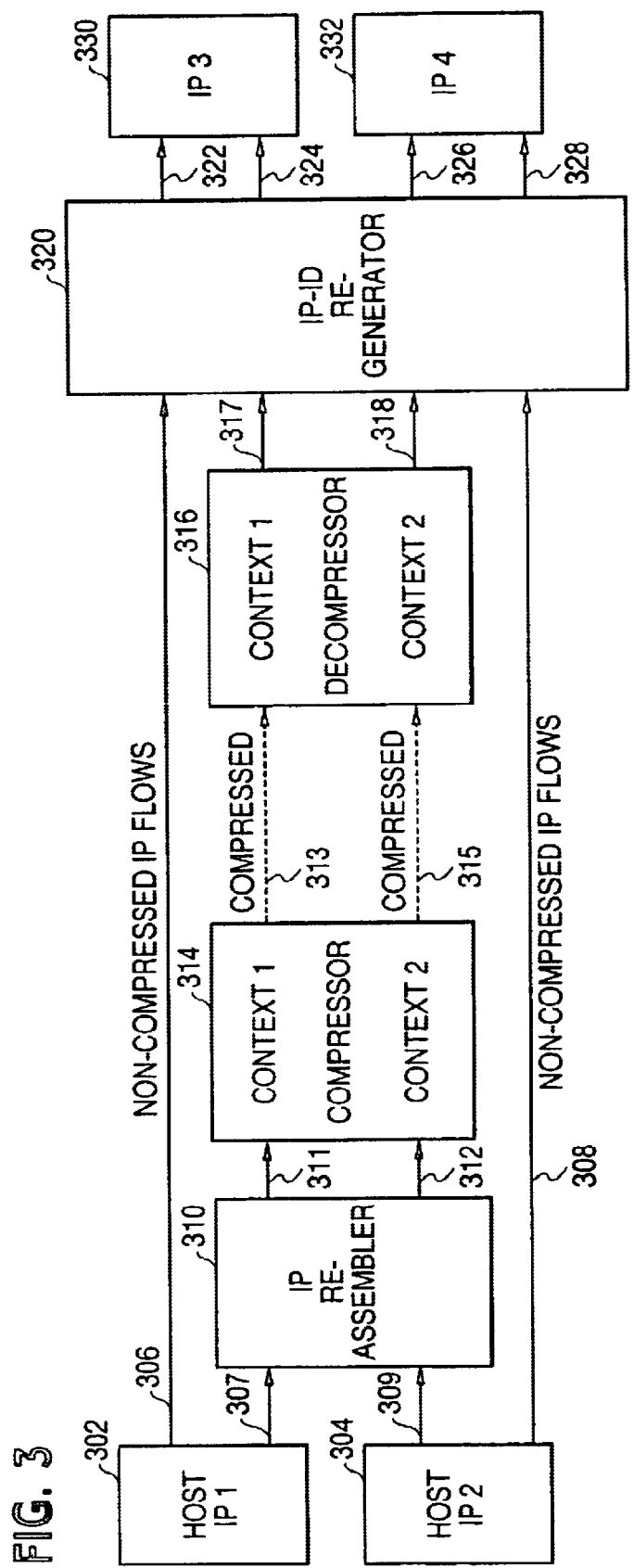
FIG. 3 illustrates the IP-ID regeneration scheme for flows in one direction according to the present invention.

The features of the present invention are illustrated, for example, in FIG. 3. As described above, a goal of the present invention is to avoid compressing the IP-ID for each packet, yet still allow the destination host to receive the original packets with the header of each packet being compressed.

Figure 1:
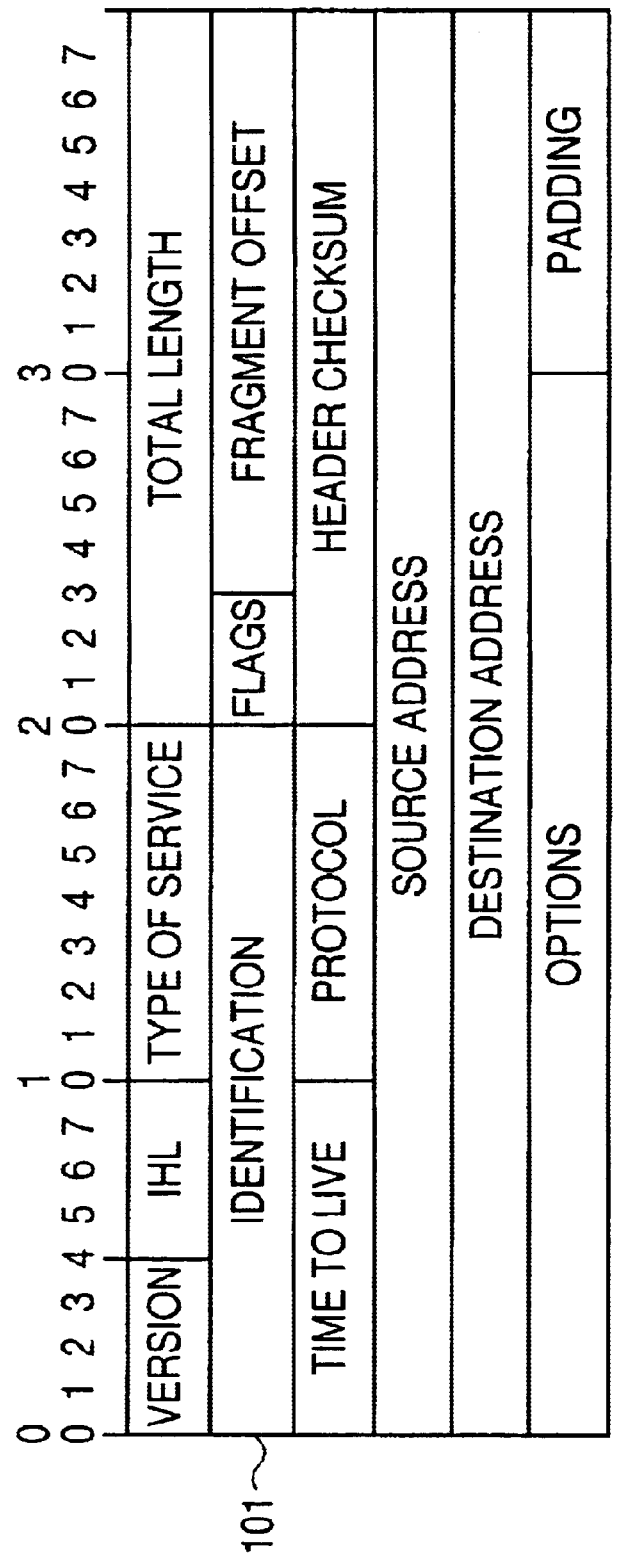
FIG. 1 illustrates the format of the header of the packet according/to IPv4.
Figure 2:
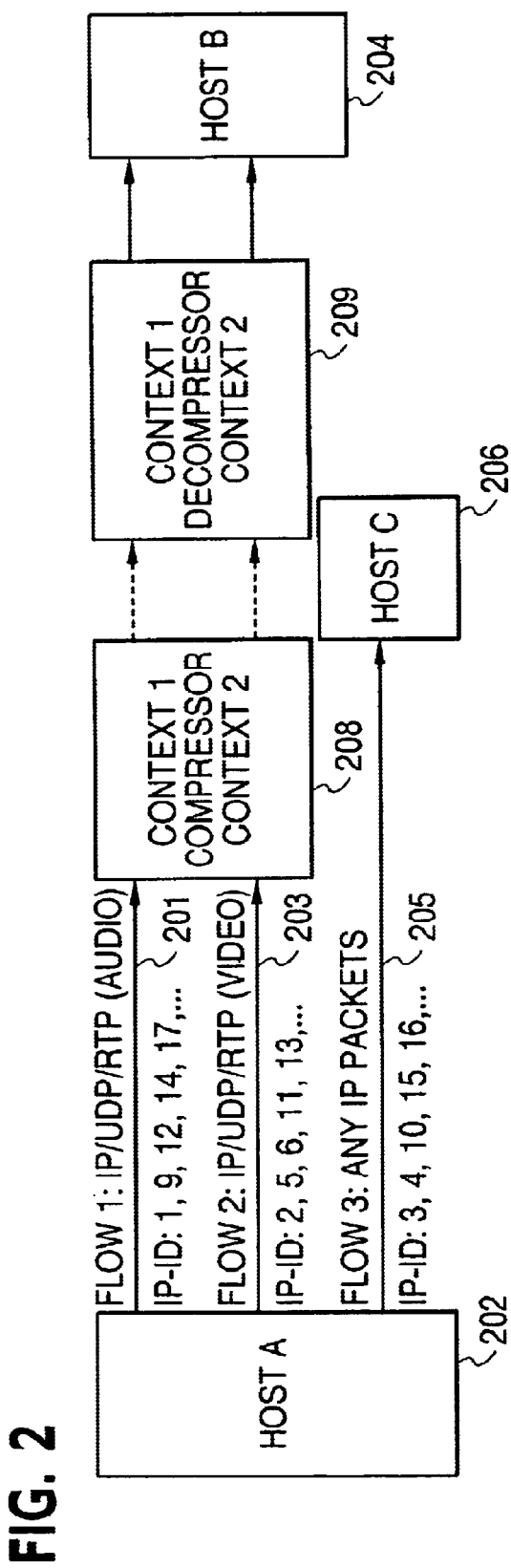
FIG. 2 illustrates IP-ID sequences of different flows originating from the same source host in conventional apparatus.

As illustrated in FIG. 3, a host IP1 302 is provided for transmitting non-compressed IP flow 306 having packets where each header of each packet is not compressed, and IP flow 307 having packets where each header of each packet is to be compressed. The headers of the packets of the IP flow 307 can, for example, have non-linear and unpredictable IP-ID's such as that illustrated as the first flow 201 in FIG. 2 when the packet form a transmission unit.

Another host IP2 304 is provided for supplying non-compressed IP flows 308 similar to the non-compressed IP flow 306 and an IP flow 309 similar to IP flow 307. The IP flows 307 and 309 are supplied to an IP reassembler 310. The IP reassembler 310 reassembles all of the packets which are identified by each of their IP-ID's as being a part of the same transmission unit. Thus, for example, the IP reassembler reassembles all of the packets corresponding to IP flow 307 identified as being part of the same transmission unit and outputs the reassembled packets as IP flow 311. IP flow 311 is supplied to compressor 314. The same operation is performed with respect to IP flow 309 by the IP reassembler 310. Specifically, all of the packets corresponding to IP flow 309 identified as being a part of the same transmission unit are reassembled and output as IP flow 312. IP flow 312 is supplied to the compressor 314.

The compressor 314 first removes the IP-ID from each of the headers of each of the packets that form the transmission unit and then compresses the headers of the packets according to a context for the particular flow. Specifically, for example, to accomplish header compression, the compressor 314 stores information corresponding to the header of a full header packet, removes the headers of each of packet subsequent to the full header packet, compresses the headers with the IP-ID's removal according to a context, and transmits each of the packets with a compressed header. The stored information corresponding to the header of the full header packet is the context. Thus, as illustrated in FIG. 3, the flow 311 is compressed according to a context 1 and output as compressed flow 313 and the flow 312 is compressed according to a context 2 and output as compressed flow 315.

The full header packet which is used to create the context in the compressor 314 is also transmitted to decompressor 316 to create a corresponding context therein. Particularly, for example, the full header packet of the IP flow 311 is used to create context 1 in decompressor 316 and the full header packet of IP flow 312 is used to create context 2 in decompressor 316.

The decompressor 316 decompresses the header of each packet of each flow according to their respective context. Thus, the compressed headers of the compressed flow 313 are decompressed by the decompressor 316 according to context 1 and supplied to IP-ID regenerator 318 as a decompressed IP flow 317 and the compressed headers of the compressed flow 315 are decompressed by decompressor 316 according to context 2 and supplied to the IP-ID regenerator 320 as a decompressed IP flow 318. The decompressed headers of each of the packets of IP flows 317 and 318 each do not contain an IP-ID in the IP-ID field 101.

Each of the flows 306, and 308 are supplied to IP regenerator 320 along with flows 317 and 318. The headers of the packets of the flows 306 and 308 contain an IP-ID in the IP-ID field 101. The IP-ID regenerator 320 regenerates new IP-ID's for each of the packets of each of the flows 306, 308, 317 and 318. The IP-ID regenerator 320 regenerates IP-ID's according to a manner such that packets of the same transmission unit are identified as belonging to the transmission unit. Particularly, the responsibility of the IP-ID regenerator 320 is to assign new IP-ID's at the decompressor side even though the IP-ID regenerator 320 may be supplied with two types of IP flows, namely IP flows that have gone through header compression, flows 317 and 318, and IP flows that have not gone through header compression (flows 306 and 308). Each of these types of flows must be handled differently by the IP-ID regenerator 320.

If a packet belongs to a flow such as IP flows 317 and 318, then the IP-ID regenerator 320 is aware that the packet is, for example, a non-fragmented packet and that no IP-ID appears in the IP-ID field of the header. However, if a packet belongs to a flow such as IP flows 306 and 308, then the IP-ID regenerator is aware that the packet is, for example a fragmented packet and that an IP-ID appears in IP-ID field of the header. The IP-ID in such a packet causes information indicating that it is a fragmented packet since the reassembly of the packet with other packets of the same transmission unit has not been conducted. Thus, there may be, for example, two packets arriving at the IP-ID regenerator 320 sent from the same source host to the same destination host that contain the same IP-ID. For this and other reasons the IP-ID regenerator 320 has to maintain the mapping from the original IP-ID to the new assigned IP-ID.

Assuming that the function of the IP reassembler 310 has not been performed and the packet is from a flow that has not been subjected to header compression, then the algorithm which can be used by the IP-ID regenerator 320 to assign a new IP-ID is set forth below.

For each source IP address, destination IP address pair there is an IP-ID context which includes a 2-byte counter in IPv4 (4-byte counter in IPv6) and an IP-ID mapping table denoted as ID_MT. The ID_MT is used for the packet fragments and has three columns. For each entry in the ID_MT the first column contains the IP-ID, the second column contains a corresponding new IP-ID, and the third column has time information indicating the age of the entry. Entries with an age older than 30 seconds for IPv4 (60 seconds for IPv6) will be deleted automatically.

Below is the algorithm the IP-ID regenerator 320 executes upon receiving a packet:

```
New_IP_ID(ip_packet)
{
    search for the IP-ID context by (src_IP_addr,dest_IP_addr);
    if not found
        create a new context;
    counter←context.counter;
    ID_MT←context.ID_MT;
```

-continued

```
    if ip_packet is not a fragment      /*i.e.,the More-Fragment
                                          bit=0*/
    {
        new ip_id←counter;
        counter←counter + 1;
    }
    else                                /* this packet is a
                                          fragment*/
    {
        old_ip_id←IP-ID in the packet;
        search ID_MT for the entry whose column 1 = old_ip_id;
        if not found
        {
            create a new entry, column 1 ← old_ip_id, column
            2←counter,
            column 3←0;
            counter←counter + 1;
        }
        new ip_id←entry.new_ip_id;      /*i.e., the column 2 */
    }
}
```

Note that as soon as one flow goes through header compression and through the IP-ID regenerator 320, all flows originated from the same host and sent to the same destination must also go through the IP-ID regenerator 320. Otherwise it would be impossible to avoid IP-ID collision, i.e., different packets in a flow appearing at the end receiver with the same IP-ID. Such collisions confuse and corrupt the reassembler module of the receiver.

To speed up execution of the above algorithm by the IP Regenerator, an IP-ID context table could be implemented as a hash table on the source IP address, destination IP address. Each of the ID_MT's could also be implemented as a hash table on the value of the old IP-ID.

The above procedure described with respect to a situation where the packet being considered has not been subjected to header compression is generic and rather rigorous. Many optimizations could be applied based on different assumptions. For example, if the following conditions are true:

1) The host increments the IP-ID counter by one for each outgoing packet;
2) The IP-ID's in the headers of the packets are coded in network byte order (i.e. big-endian); and
3) The maximum lifetime of any packet (or fragment) is less than the time for the IP-ID counter to increment 215 (32768) in IPv4 or 231 ($2 \times 10^9$) in IPv6 at its source host.

Then there is no need to maintain an ID_MT for each source IP address, destination IP address pair. Instead, only a 15-bit counter for IPv4 or a 31-bit counter for IPv6 is needed. Thus, the following more efficient algorithm can be executed by the IP-ID Regenerator 320:

```
New_IP_ID(ip_packet)
{
    if IP_packet is not a fragment      /*i.e., the More-Fragment
                                          bit = 0*/
    {
        search for the IP-ID counter by (src_IP_ addr, dest_IP_addr);
                    /* the counter is 1 bit shorter than the IP-ID*/
        if not found
            create a new counter;
        new ip_id←counter;
        counter←counter + 1;
    }
}
```

```
    else                       /* this packet is a fragment */
{
        old_ip_id←counter;
        new ip_id←(old_ip_id & 0x7FFF) | 0x8000;    /* &
                                                       means
                                                       bitwise
        and; | means bitwise or */
    }
}
```

Basically, the 2-byte IP-ID in IPv4 or the 4-byte IP-ID in IPv6 is divided into two subspaces. One is for those unfragmented packets where the most significant bits (MSB) of their new IP-ID is always 0 and the least significant bits (LSB) are set to the counter. The other subspace is for those fragmented packets where the MSB of their new IP-ID is always set to 1 and the LSB are set to the original IP-ID.

Further optimizations are possible such as one IP-ID counter per source IP address instead of per source IP address, destination IP address pair, one counter per destination IP address or even a single counter for all packets. However, each optimization is based on some assumptions which must be verified carefully in implementation.

Besides assigning an IP-ID for each packet, the IP-ID regenerator 320 must set the More Fragments flag bit in the header in each packet to zero and recalculate the header checksum of each header. It is assumed that the original check sum has been verified by the IP reassembler 310 and/or the compressor 314 and the communication channel provides error protection.

The present invention does not negatively effect the scalability of a system to which it is applied since packet reassembly is required prior to header compression. The overhead for performing these operations as described in the present invention is not significant since the reassembly operation rarely occurs. In a system to which the present invention is applied, header compression is most advantageous with packets with small payloads. Real-time multimedia packets being transmitted over IP networks is a perfect example of the use of packets having small payloads. RTP packets that carry audio are normally less than 100 bytes. Therefore, fragmentation rarely occurs even when such packets traverse many routers. With respect RTP packets carrying video the size can be large and may vary significant from packet to packet. In such a situation, the scheme of the present invention of IP-ID regeneration may have some benefits.

Most of the discussion above concerning the present invention is with respect to the IP-ID carried in the header of a packet formed according to IPv4. However, in IPv6 the IP-ID is carried in the extension header. According to IPv6 only the source of the packet is allowed to perform packet fragmentation. In Ipv6 before sending a packet, the source host determines the path MTU (minimum MTU along the path to the destination) and then decides whether fragmentation is necessary. If fragmentation is necessary, the IP-ID is placed in the extension header. The invention with respect to a packet formed according to IPv6 can be applied to the IP-ID even though it is placed in the extension header.

According to the above, the present invention provides a method and apparatus for performing IP-ID regeneration so as to improve header compression efficiency. The present invention accomplishes this by avoiding the compression of the IP-ID field of the header of a packet since the IP-ID can be non-linear and unpredictable. The present invention avoids such compression of the IP-ID of the packets that form a transmission unit by reassembling the packets that form the transmission unit and removing the IP-ID information from the headers of the packets that form the transmission unit. After removing the IP-ID from the header of each of the packets, the headers of each of the packets are compressed and the packets having the compressed headers are transmitted from the compressor to the decompressor. The decompressor upon receiving the packets having the compressed headers, decompresses the compressed headers to obtain the packets that form the transmission unit. Thereafter, new IP-ID's for the packets are regenerated and inserted into the headers of each of the packets.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. In a system having a transmitter which transmits a plurality of packets to a receiver, each of the packets containing a header, a method of reducing the overhead for compressing headers of a plurality of packets that form a transmission unit, wherein each header of each packet includes identification (ID) information identifying the packet as part of the transmission unit, comprising:
  reassembling the packets that form the transmission unit;
  removing the ID information from the headers of the packets that form the transmission unit;
  after removing the ID information, compressing the headers of the packets that form the transmission unit and transmitting the packets having the compressed headers from the transmitter to the receiver;
  receiving in the receiver the packets having the compressed headers and decompressing the compressed headers to obtain the packets that form the transmission unit; and
  regenerating new ID information and inserting the new ID information in each of the headers of the packets that form the transmission unit.

* * * * *